(12) United States Patent
Goller

(10) Patent No.: US 7,004,608 B2
(45) Date of Patent: Feb. 28, 2006

(54) HEADLIGHT UNIT FOR A VEHICLE

(75) Inventor: Michael Goller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/378,977

(22) Filed: Mar. 5, 2003

(65) Prior Publication Data
US 2003/0179588 A1 Sep. 25, 2003

(30) Foreign Application Priority Data
Mar. 19, 2002 (DE) .............................. 102 11 972

(51) Int. Cl.
B60Q 1/00 (2006.01)

(52) U.S. Cl. .................... 362/546; 507/505; 507/523; 507/549; 507/376

(58) Field of Classification Search ............... 362/546, 362/507, 506, 505, 523, 549, 496, 376, 369, 362/306
See application file for complete search history.

(56) References Cited

U.S. PATENT DOCUMENTS

| 4,249,232 | A | * | 2/1981 | Dick ........................... 362/547 |
| 4,695,928 | A | * | 9/1987 | Schauwecker et al. ...... 362/549 |
| 6,331,068 | B1 | * | 12/2001 | Chase ........................ 362/549 |
| 2001/0046140 | A1 | | 11/2001 | Chase et al. |

FOREIGN PATENT DOCUMENTS

| DE | 3108059 | 1/1984 |
| DE | 3442902 | 6/1986 |
| DE | 3802104 | 8/1989 |
| DE | 4127716 | 6/1992 |
| DE | 19732301 | 2/1998 |
| DE | 19742816 | 4/1999 |
| DE | 19950592 | 4/2000 |
| DE | 19926346 | 12/2000 |
| DE | 69900059 | 8/2001 |
| FR | 2781735 | 2/2000 |
| FR | 2789028 | 8/2000 |
| FR | 2808075 | 10/2001 |
| FR | 2813828 | 3/2002 |

OTHER PUBLICATIONS

German Search Report.

* cited by examiner

Primary Examiner—Sandra O'Shea
Assistant Examiner—Bertrand Zeade
(74) Attorney, Agent, or Firm—Crowell & Moring LLP

(57) ABSTRACT

A vehicle headlight unit has a headlight housing covered by a pane on its front side. The headlight unit is held relative to the vehicle body by a support which yields in the longitudinal direction of the vehicle under the effect of force. The pane is fixedly connected with one side of the support and the opposite side of the support is fastened to the headlight unit housing. The yielding support may comprise a rubber bellows.

17 Claims, 1 Drawing Sheet

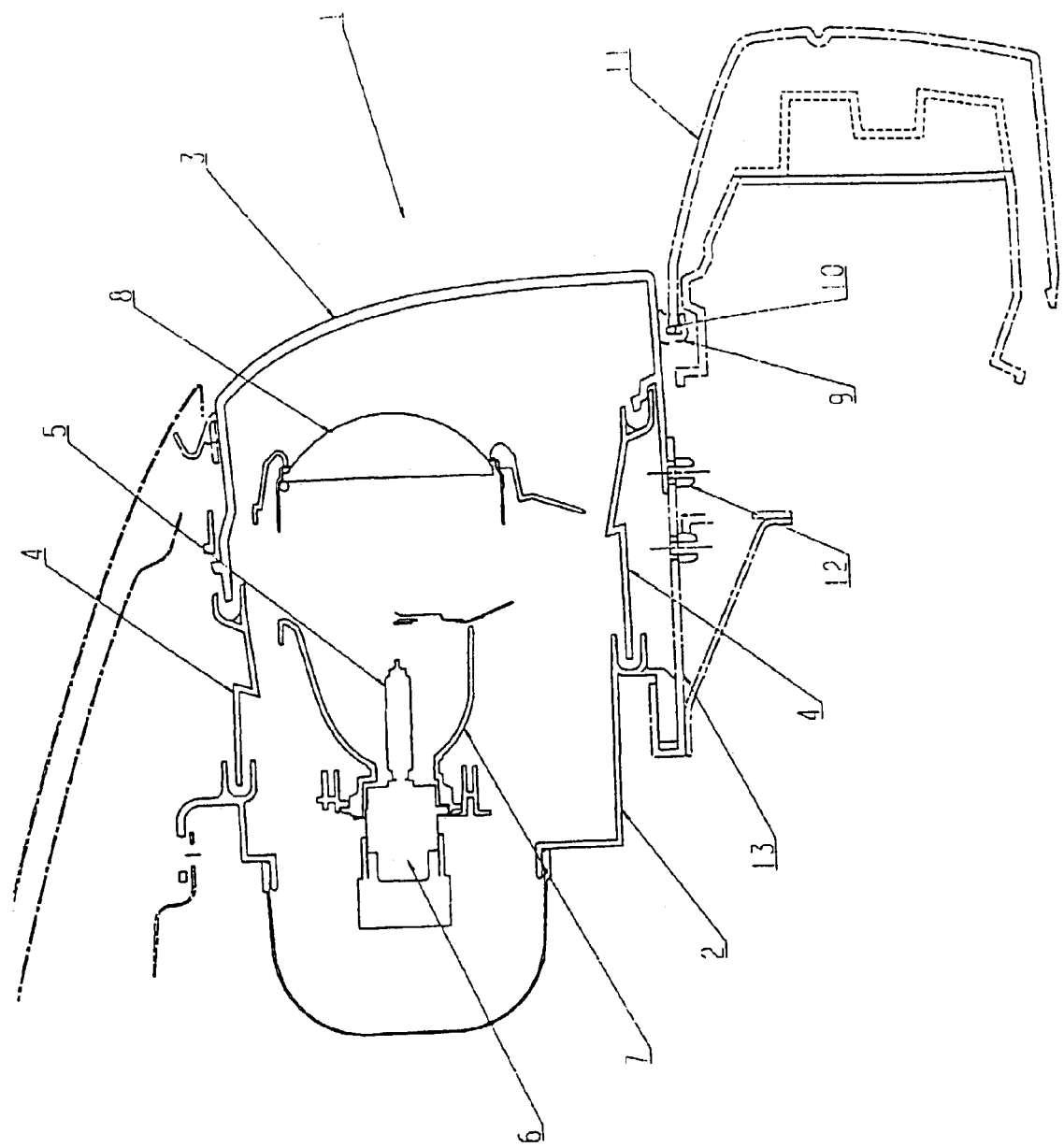

HEADLIGHT UNIT FOR A VEHICLE

BACKGROUND AND SUMMARY OF THE INVENTION

This application claims the priority of German patent application 102 11 972.4, filed Mar. 19, 2002, the disclosure of which is expressly incorporated by reference herein.

The invention relates to a headlight unit for a vehicle.

German Patent Document DE 34 42 902 C1 discloses a headlight unit for a vehicle which has a headlight housing covered on the front side by a lens. The headlight unit is mounted to the vehicle body by means of a support which gives way in the longitudinal direction of the vehicle under the effect of force. As a result of this design, a certain movement of the headlight unit is permitted in the event of an impact of the vehicle upon traffic participants, such as pedestrians or motorcycle or bicycle operators.

One object of the present invention is to improve such known headlight unit, such that the risk of injury to traffic participants is reduced even further.

This and other objects and advantages are achieved by the vehicle headlight according to the invention, which is fastened to the vehicle body, and has a headlight housing covered on the front side by a plastic pane. The pane is fixedly connected with one end of a support which yields under the effect of force, and the opposite end of the support is fastened to the headlight housing.

Due to installation space limitations, currently most headlight units can only be displaced slightly toward the rear in the event of a crash because, for example, the wheel well, is situated just behind the headlight unit. Furthermore, today's headlight units may have a mass of five kilograms or more. Because of the resulting inertia, such a headlight unit which can be displaced toward the rear would not offer sufficient protection to an impacting traffic participant.

In contrast, the headlight unit according to the invention offers sufficient protection to traffic participants because only the front-side pane yields under the effect of force, and not the entire headlight unit. The pane alone weighs so little that the inertia of its mass represents no danger to an impacting traffic participant. The rest of the headlight unit can be fixedly mounted on the vehicle body, and no space has to be reserved behind the headlight unit for a possible displacement of the entire headlight unit.

The yielding support advantageously consists of a rubber bellows. This is a simple and cost-effective possibility of implementing the desired yielding support.

In order to prevent pane from being displaced accidentally, in an advantageous construction, it has locking devices on its edge, such as noses or balls or corresponding counterparts, that are used for locking the pane in a normal position, and also permit a displacement of the pane out of its normal position in response to a defined force acting upon it. For example, spherical humps are mounted laterally on the pane, which humps are form-lockingly held in corresponding ball sockets on the headlight housing. These humps may either easily break off under the effect of force, or the headlight housing and the pane respectively have a slight elasticity so that the above-described form closure is released under the effect of force.

It is also advantageous for the pane to be connected at least also with a bumper by way of the locking devices or corresponding counterparts. In the event of an accident with a traffic participant, the latter often first contacts the bumper before he impacts on the pane of the headlight unit. In the process, the bumper is usually deformed. By virtue of the connection of the pane with the bumper, the pane already starts to partly shift to the rear when the bumper is pushed to the rear by the traffic participant's impact.

During a displacement of the pane toward the rear, it could become caught on laterally adjoining components. In order to prevent this occurrence, the pane may be guided by way of at least one guide rail. For this purpose, sliding bodies mounted, for example, on the edge of the pane, are guided in a guide rail, which may be connected with the headlight unit housing.

The pane may advantageously be displaced back into its normal position by a spring effect after the cessation of the effect of the force. As a result, the headlight need not be returned manually into its normal position, at high expenditures. (This is particularly advantageous if the impact was so weak that a displacement of the pane would not have been absolutely necessary.) The spring effect can, for example, be provided by an elastic yielding support, such as rubber bellows. However, separate springs may also be housed, for example, in guide rails.

Ideally, the pane can be displaced toward the rear by at least 20 mm viewed in the driving direction. In this case, it is assumed that the lighting device or a lens arranged in front of the latter is set back correspondingly far behind the pane so that it does not interfere with the pane when it is displaced toward the rear. In this manner, it can be ensured, starting at a possible displacement of at least 20 mm, that the impact energy acting upon the traffic participant is reduced to a biomechanically tolerable deceleration level.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic sectional view of a headlight unit according to the invention, taken along the longitudinal direction of the vehicle.

DETAILED DESCRIPTION OF THE DRAWINGS

The headlight unit 1 consists of a headlight housing 2. On its front end, the headlight housing 2, which is made of a plastic material is closed off by a pane 3 (also made of a plastic material) that is connected to the headlight housing 2 by way of elastic rubber bellows 4. The actual light device 5 is accommodated in the headlight housing 2 in a mounting 6. A reflector 7 arranged around the lighting device 5 directs the light therefrom through a lens 8 and then through the pane 3.

At its lower edge, the pane 3 has a hook 9 which is hooked together with a rearward upper nose 10 of a bumper 11. As a result, the pane 3 is held securely in the illustrated normal position. The hook 9 is designed so that the application of a force exceeding a defined amount onto the pane 3 causes it to break off, allowing the pane 3 to shift unhindered against the spring force of the rubber bellows 4 toward the rear.

So that the pane will not be jammed at adjoining components in the event of a nonuniform displacement, it is guided in a guide rail by means of a sliding block 12 injection-molded to its lower edge. The guide rail 13 is fastened to the headlight housing 2. In this case, the sliding block 12 protrudes out of the guide rail 13 at the bottom.

When a traffic participant impacts on a vehicle having the headlight unit 1 and the bumper 11, he or she normally first impacts on the bumper 11. The latter is thereby displaced toward the rear so that the hook 9 breaks off. The pane 3 is therefore no longer fixed in its normal position. When the bumper 11 shifts to the rear by more than 25 mm, it pushes the sliding block 12 of the pane 3 toward the rear by means of its upper rear edge. As a result, in the event of a correspondingly violent impact of a traffic participant, the pane 3 automatically yields in a translatory manner together with the bumper 11.

If, in contrast, the traffic participant first impacts on the pane 3 instead of on the bumper 11, the hook 9 will also break off, starting when a defined impacting force is applied. Subsequently, the pane yields toward the rear in a translatory manner against the spring force of the rubber bellows 4 while being guided in the guide rail 13 by means of the sliding block 12.

After the impact, the pane 3 is automatically pushed back toward the front into the normal position by means of the spring force of the rubber bellows 4. However, the pane 3 can no longer be fixed there because the hook 9 has broken off. Although the headlight unit 1 can still be used in this condition, the pane 3 should nevertheless be exchanged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A headlight enclosure for a vehicle, comprising:
   a rigid cup shaped member fixedly mounted to a body of the vehicle;
   a pane member disposed opposite an open end of said cup shaped member; and
   an elastically deformable member connecting a perimeter of said cup shaped member and a perimeter of said pane member so as to complete said enclosure;
   wherein said pane member is resiliently displaceable toward said cup shaped member by elastic deformation of said deformable member, in response to application of a predetermined force upon the pane member.

2. The headlight enclosure according to claim 1, wherein said elastically deformable member has peripherally extending collapsible ridges.

3. The headlight enclosure according to claim 1, wherein said elastically deformable member comprises a bellows.

4. The headlight unit according to claim 3, wherein:
   the pane has locking devices on its edge, which lock the pane in a normal position; and
   upon application of a predetermined force upon the pane, the locking devices permit displacement of the pane out of its normal position.

5. The headlight unit according to claim 4, wherein said locking devices are breakable in response to application of said predetermined force upon the pane, permitting said displacement of the pane.

6. The headlight unit according to claim 1, wherein the pane is also connected with the bumper by way of locking devices.

7. The headlight unit according to claim 6, wherein:
   said locking devices are breakable in response to application of a predetermined force upon the pane; and
   breakage of said locking devices releases said pane, permitting rearward displacement of said pane toward said cup shaped member.

8. The headlight unit according to claim 7, wherein displacement of the pane is guided by at least one guiding device.

9. The headlight unit according to claim 1, wherein displacement of the pane is guided by at least one guiding device.

10. The headlight unit according to claim 1, wherein the pane is displaceable by at least 20 mm rearwardly relative to a driving direction of the vehicle.

11. A headlight unit for a vehicle, comprising:
    a headlight housing which is fastened to the vehicle body, and covered on the front side by a pane; and
    support means for maintaining said pane in a spatial relation to said housing, and for permitting a translational movement of said pane relative to and toward said housing in response to application of a predetermined force to said pane; wherein,
    one end of said support means is fastened to the headlight unit housing, and an opposite end of said support means is fixedly connected to the pane; and
    the support means gives way in response to application of said predetermined force, permitting said translational movement of said pane.

12. The headlight unit according to claim 11, wherein the pane is displaceable by at least 20 mm rearwardly relative to a driving direction of the vehicle.

13. The headlight unit according to claim 11, wherein the support means comprises a rubber bellows.

14. The headlight enclosure according to claim 13, wherein said rubber bellows has peripherally extending collapsible ridges.

15. The headlight unit according to claim 11, wherein:
    the pane has locking devices on its edge, which lock the pane in a normal position; and
    upon application of a predetermined force upon the pane, the locking devices permit displacement of the pane out of its normal position.

16. The headlight unit according to claim 15, wherein said locking devices are breakable in response to application of said predetermined force upon the pane, permitting said displacement of the pane.

17. The headlight unit according to claim 16, wherein displacement of the pane is guided by at least one guiding device.

* * * * *